Jan. 15, 1957  W. E. CHEELEY  2,777,601
CONTAINER AND EASY OPENING COVER THEREFOR
Filed May 23, 1956  2 Sheets-Sheet 1
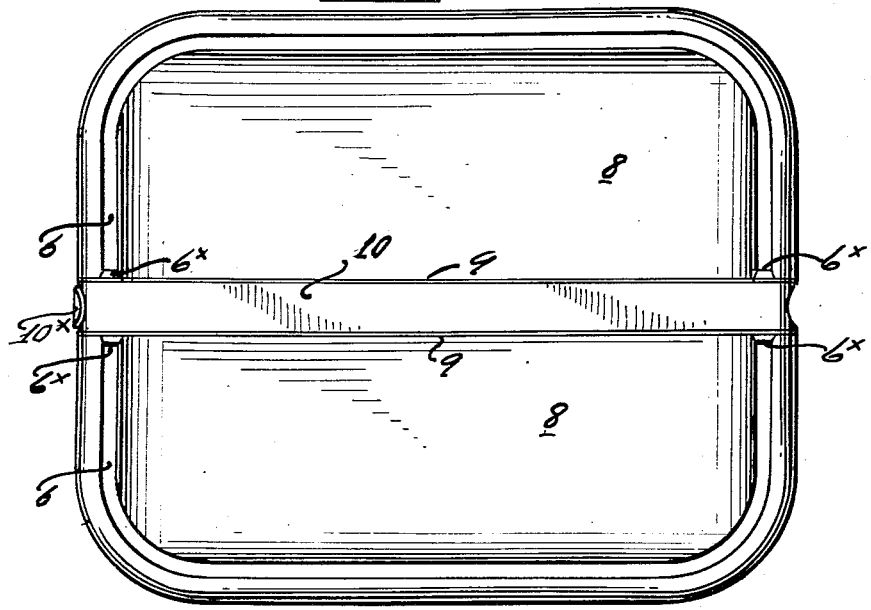
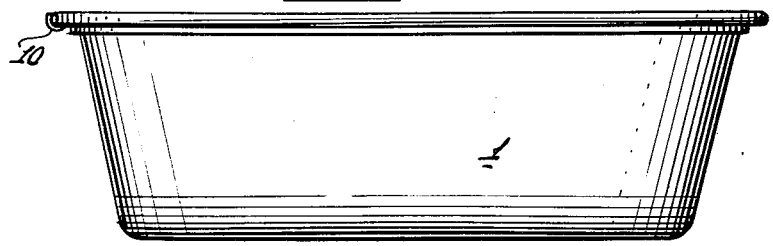
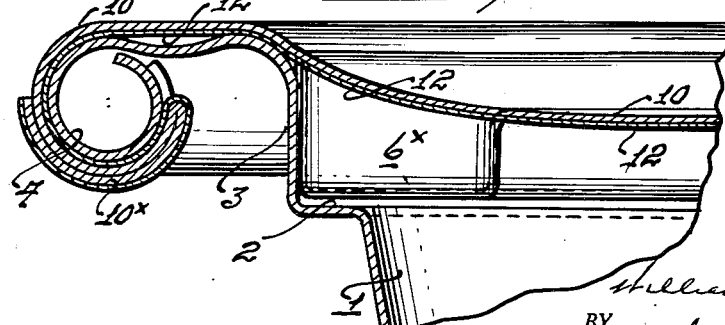
INVENTOR.
William E. Cheeley
BY
N. Lee Helms
ATTORNEY.

Jan. 15, 1957    W. E. CHEELEY    2,777,601
CONTAINER AND EASY OPENING COVER THEREFOR
Filed May 23, 1956    2 Sheets-Sheet 2
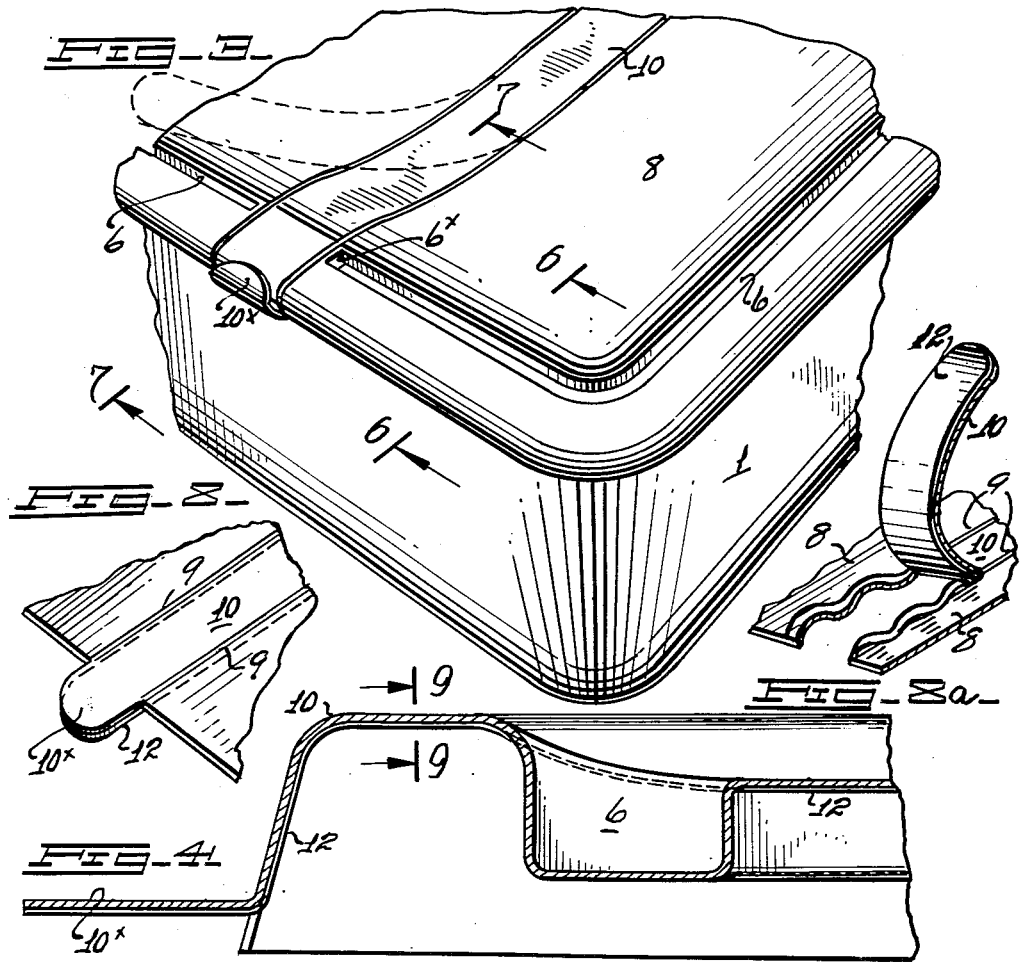
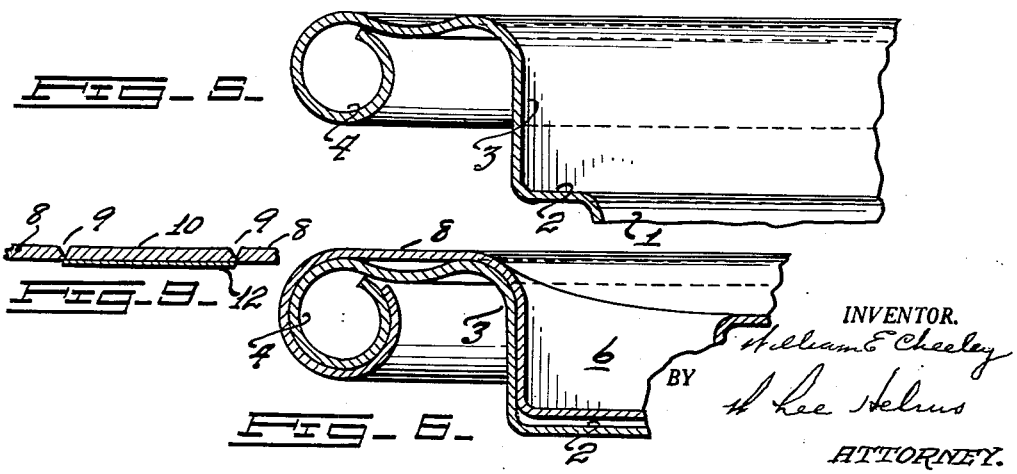
INVENTOR.
William E. Cheeley
BY
H. Lee Helms
ATTORNEY.

2,777,601

CONTAINER AND EASY OPENING COVER THEREFOR

William E. Cheeley, Louisville, Ky., assignor to Reynolds Metals Company, Richmond, Va., a corporation of Delaware Application May 23, 1956, Serial No. 586,804

3 Claims. (Cl. 220—54)

The object of the present invention is to provide a container, and particularly a lid or cover therefor, in which at least the lid is made of aluminum foil, the covered and sealed container being adapted for frozen food and other products requiring a high degree of protection against moisture-loss or gain, loss of flavor and freshness, also against oxidation of the fatty and oil content.

I have discovered that a specially provided easy opening tear strip, of which the metallic part is integral with the cover, may be so provided that during the opening operation the severed edges of the cover are brought upwardly into a corrugated form, which prevents finger or hand laceration in handling the cover at the cut edges, as in tearing the complete cover away or in tearing part thereof away, and this is an important object of the invention. In addition, the cover or lid, with its integral tear strip, as to the metallic component thereof, is of special form, maintaining the sealing feature of the cover along with easy opening thereof.

The invention will be described with reference to the accompanying drawings, in which:

Fig. 1 is a plan view of an aluminum foil cover constructed in accordance with the invention;

Fig. 2 shows in elevation a container and the cover applied thereto;

Fig. 3 is a fragmentary isometric view looking toward a corner of the covered container, and showing in dotted lines the partially raised tearing strip;

Fig. 4 is an enlarged longitudinal and vertical section taken adjacent the tearing strip of Fig. 3 at the right-hand margin thereof;

Fig. 5 is a fragmentary vertical section through the upper area of the container;

Fig. 6 is a view similar to Fig. 4 showing the structure of Fig. 4 in sealing relation to the container, and taken on the line 6—6 of Fig. 3;

Fig. 7 is an enlarged vertical section taken on the line 7—7 of Fig. 3;

Fig. 8 is a fragmentary view looking down on an area of the cover containing the projecting end of the tearing strip prior to channeling the cover in the manner as shown in Fig. 3;

Fig. 8a is a perspective and enlarged schematic view showing the corrugation effect produced by pulling and activating the tear strip; and Fig. 9 is a fragmentary section taken on the line 9—9 of Fig. 4.

Referring to the drawings, at 1 I have shown a suitable form of container which may be made of any suitable material, preferably of aluminum foil. In the said embodiment, the container has outwardly tapered side wall rising to a shoulder at 2, from which extends a vertical section at 3. From the vertical section the metal is turned outwardly and curled to form an annular rim at 4.

The cover is preferably of aluminum foil, and a suitable gauge being from 0.002"–0.006", and the cover can be printed or unprinted. In the present embodiment, the container is rectangular with rounded corners and formed with opposed U-shaped channels 6 separated at the narrower sides of the container by continuations of the substantially flat wall 8. Thus each U-shaped channel ends with two upstanding walls 6x, which walls may be tapered as indicated in Fig. 1, or vertical as shown in Fig. 3.

As shown in Figs. 1 and 3, the metal of flat wall 8 and extending across the opposed bridge areas laterally bounded by walls 6x, has parallel scored lines 9 bounding a tear strip area 10. Also, as shown in Fig. 8, at the left-hand of the cover material, the tear strip area is elongated to form a lip 10x.

When the cover is applied to the container, the downwardly projecting walls of channel 6 are adapted to rest upon the shoulder 2 of the container, and the margins of the cover are curled around the annular rim of the container, shown more particularly in Fig. 6. At this point, there obviously is extra projecting material of the cover at the end of the tear strip 10 and forming a lip 10x, and this lip is reversely folded, as shown in Fig. 7, so that its tip end is exposed for ready seizure by the fingers to release the end of the tear strip for a pulling operation to sever it from the major wall 8.

A danger in the tearing away of a metallic sheet, by means of a tear strip, lies in the fact that sharp edges of the metal endanger the hands of the operator in the additional cover opening operations, and, as hereinbefore started, a primary feature of the invention is to prevent or minimize such danger. To this end, and preferably at the lower face of the cover, I apply between the score lines 9 a strip 12 of plastic film which has, I discovered, a highly desirable and unexpected effect. The strip of plastic film is, of course, more yielding and very greatly less in hardness than the aluminum foil or equivalent metal employed in the cover. It may be "Milar," polyethylene, cellophane, "Pliofilm" (rubber hydrochloride), and other materials of the same general characteristics. This film strip is laminated, i. e. adhesively bonded to the tear strip area.

When the lip 10x is pulled outwardly from its position, Fig. 7, and then by firm grasp of the fingers is used to tear away the tear strip area for opening the cover, reaction between the plastic film and the tearing area of the metal causes the edges of the latter to rise in undulations of somewhat "corrugated" form, as schematically indicated in Fig. 8a. Thus, instead of forming a shearing or knife edge at each side of the cover at the torn-away area, the edges are blunted and do not have a knife edge, and safety is assured.

It will be understood that the plastic film bonded to the metal of the cover intermediate the weakened lines bonding the tear strip, will be of a substance capable of lamination by adhesion to the foil, and preferably heat sealing, and it will also be non-toxic. With the plastics specified, and also including the vinyl and Saran plastics, the invention may be in the form of closed containers enabling the heating and serving directly in the container of foodstuffs, inasmuch as the plastics will withstand heating at high temperatures, whereas, up to the present time, there has not been provided convenient method of removing the cover from a disposable foil container, when the cover is secured in such manner as to adequately seal the contents. The thickness of the plastic film may range from 0.00025" upwardly, but is preferably in the order of 0.0005–0.0010".

It will be understood that various modifications may be made in the form and arrangement of the elements employed in the embodiment illustrated, without departing from the spirit of the invention.

Having described my invention, what I claim and desire to secure by Letters Patent is as follows:

1. In containers, a cover made of manually tearable metal and having a peripheral downwardly extending channel formation with a bridge separating opposed channel areas at opposite ends of the cover in such manner that the ends of each channel section abut vertical walls formed by the bridge areas, the metal being weakened by opposed lines extending across the cover and across said bridge areas, the metal between the weakened lines forming a tear strip, one end thereof being extended as a lip, and a plastic film bonded to one surface of said tear strip area, as and for the purpose set forth.

2. In a container having at its upper portion a shoulder and a curled rim, a cover made of manually tearable metal and having a tear strip formed by opposed weakened lines in the metal, with a plastic film bonded to the metal intermediate said weakened lines, the cover having a peripheral downwardly extending channel formation providing a rib adapted to abut said shoulder, the cover having a margin adapted for folding upon the curled rim of the container and the tear strip having a lip adapted for outward, and hence reverse, folding relatively to the said curled rim of the container.

3. In combination, a container and a cover constructed in accordance with claim 2, the tear strip bridging the channel of the cover, as and for the purpose set forth.

References Cited in the file of this patent

UNITED STATES PATENTS

| 1,359,731 | Nowack | Nov. 23, 1920 |
| 2,141,252 | Prindle | Dec. 27, 1938 |
| 2,360,597 | Topolski | Oct. 17, 1944 |

FOREIGN PATENTS

| 64,373 | Norway | Jan. 26, 1942 |